United States Patent [19]
Norton et al.

[11] Patent Number: 5,653,562
[45] Date of Patent: Aug. 5, 1997

[54] WORKPIECE MACHINING

[76] Inventors: Harry William Norton, Ludlow, Shrophire SY8 1LH; Stephen Arthur Withington, Craven Arms, Shrophire SY7 8DE, both of Great Britain

[21] Appl. No.: 560,239

[22] Filed: Nov. 21, 1995

[30] Foreign Application Priority Data

Nov. 24, 1994 [GB] United Kingdom ............... 9423704

[51] Int. Cl.$^6$ .................................................. B23B 49/02
[52] U.S. Cl. .................. 408/115 R; 408/97; 408/103
[58] Field of Search ........................ 408/115 R, 115 B, 408/103–105, 107, 108, 72 R, 72 B, 97; 33/638

[56] References Cited

U.S. PATENT DOCUMENTS

| | | | |
|---|---|---|---|
| 810,319 | 1/1906 | Blazej | 408/97 |
| 1,093,029 | 4/1914 | Bowen | 408/115 R |
| 2,734,403 | 2/1956 | Timpner | 408/105 |
| 4,790,695 | 12/1988 | Abernethy | 408/103 |

FOREIGN PATENT DOCUMENTS 217755  6/1924  United Kingdom ............... 408/115 R

*Primary Examiner*—Steven C. Bishop
*Attorney, Agent, or Firm*—Locke Reynolds

[57] ABSTRACT

Apparatus for facilitating drilling or similar machining operations upon a workpiece, the apparatus including a vertically directed vee shaped recess (15) for interchangeably receiving and centring tool guide arrangements (18) for the tools required to be used for machining the workpiece; and means (19) for cramping a selected tool guide arrangement (18) against the mutually inclined faces of the vee shaped recess (15); and with a vee shaped recess (14) whose apex (17) is directed transversely of the apex (16) of the vee shaped recess (15) and intersects the apex (16) of the vee shaped recess; a workpiece support means (26) mounted for displacement towards and away from the vee shaped recess (14) in such manner that a workpiece (27) placed upon the workpiece support means (26) can be brought into firm contact with the faces of the vee shaped recess (14), and means for positionally locating a workpiece upon the workpiece support means (26).

10 Claims, 5 Drawing Sheets

WORKPIECE MACHINING

This invention relates to the machining of workpieces.

In particular, the present invention is concerned with the provision of apparatus for facilitating the relative positioning of a workpiece and a machine tool such as a drill, reamer etc., for the purposes of executing a desired machining operation i.e., drilling, reaming etc.

It is a frequent requirement to be able to drill a through hole or a stopped end hole or holes in an element, part, component etc., having a circular or oval cross-section, in such position that the axis of the through or stopped end hole is accurately positioned with respect to the medial plane of the element etc.

A requirement for the drilling of through or stopped end holes in such locations in such an element etc., that the axis of each such hole intersects the longitudinal axis of the element etc., and such that the axis of the hole lies at a predetermined angle with respect to such longitudinal axis is one of the commonest requirements in relation to workpieces having circular, oval or elliptical cross sections.

It is well known to provide especially designed and prepared jigs or the like when it is required to drill in a similar manner a relatively large number of workpieces of the same diameter. In other words the jigs are effectively custom built for one and only one application. However, it needs to be appreciated that the production of a jig or the like is a relatively expensive operation so that it becomes totally non-economic to provide jigs for every possible diameter of a bar or tube and/or diameter of hole in anticipation that a demand should arise for the drilling of a hole with a particular diameter in a bar or tube of a particular diameter.

It is a particular object of the present invention to provide apparatus which is suitable for use with a wide range of tube or bar diameters and additionally with a range of differing drill sizes.

Broadly, according a first aspect of the invention there is provided apparatus for facilitating drilling or similar machining operations upon a workpiece, the apparatus including a vertically directed first vee shaped recess for interchangeably receiving and centring tool guide arrangements for the tools required to be used for machining the workpiece; and means for cramping a selected tool guide arrangement against the mutually inclined faces of the first vee shaped recess; and with a second vee shaped recess whose apex is directed transversely of the apex of the first vee recess and intersects the apex of the first vee recess; a workpiece support means mounted for displacement towards and away from the second recess in such manner that a workpiece placed upon the workpiece support means can be brought into firm contact with the faces of the second vee recess, and means for positionally locating a workpiece upon the workpiece support means.

In a first construction the workpiece support means of the apparatus is displaceable with respect to the main body of the apparatus for the purposes of operational setting of the workpiece.

In a second construction the said first and second vee shaped recesses are formed in a common plate which is mounted for operational displacement with respect to the main body towards or away from the workpiece support means.

In this second construction/embodiment the relative movement between the workpiece and the surfaces of the second vee-shaped recess for the purposes of exerting a required operational cramping action therebetween involves the use of a pair of chains for enabling control over the cramping pressures exertable between the workpiece and the walls of the first vee recess.

Conveniently, the chains pass over an eccentrically mounted roll located beneath the workpiece support surface and connecting with opposite sides of the common plate. Conveniently, the tool guide arrangements comprises drill, reamer or similar rotary tool bushes.

In a preferred arrangement in order to accommodate workpieces having external dimensions such that they can fully enter the first vee recess an elongate anvil member for supporting the workpiece is interposable between the support plate and the block such that the anvil member extends symmetrically lengthwise of the first recess.

Preferably, also a workpiece stop or positioning means is provided to enable easy setting of the workpiece with respect to the apparatus, whereby each one of a series of workpieces to be machined can be readily set to a predetermined setting with respect to the apparatus.

For a better understanding of the invention and to show how to carry the same into effect reference will now be made to the accompanying drawings in which.

Figure 1:
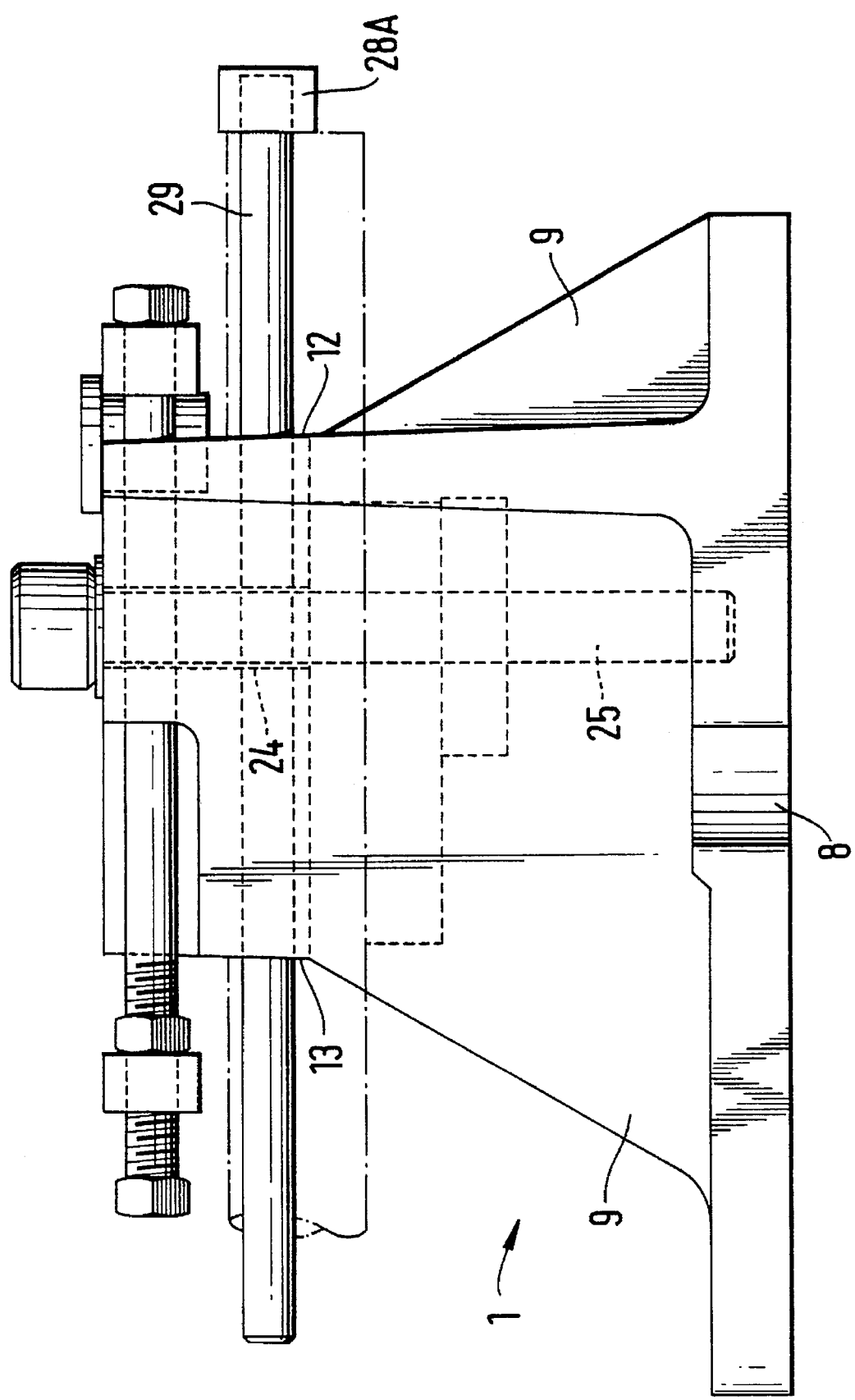
FIG. 1 is a side view of a first embodiment of apparatus incorporating the concepts of the invention.
Figure 2:
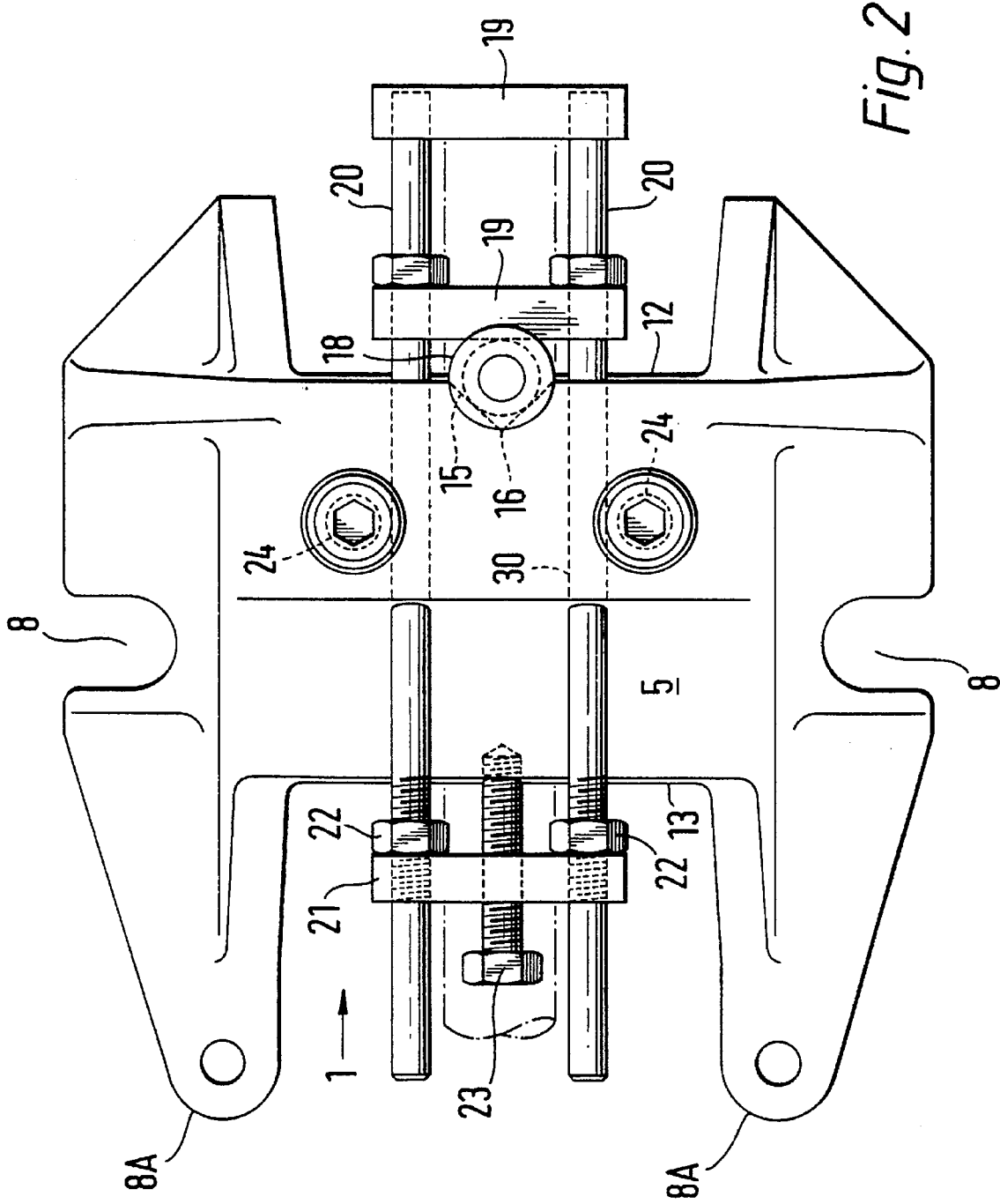
FIG. 2 is a side view of the apparatus of FIG. 1.
Figure 3:
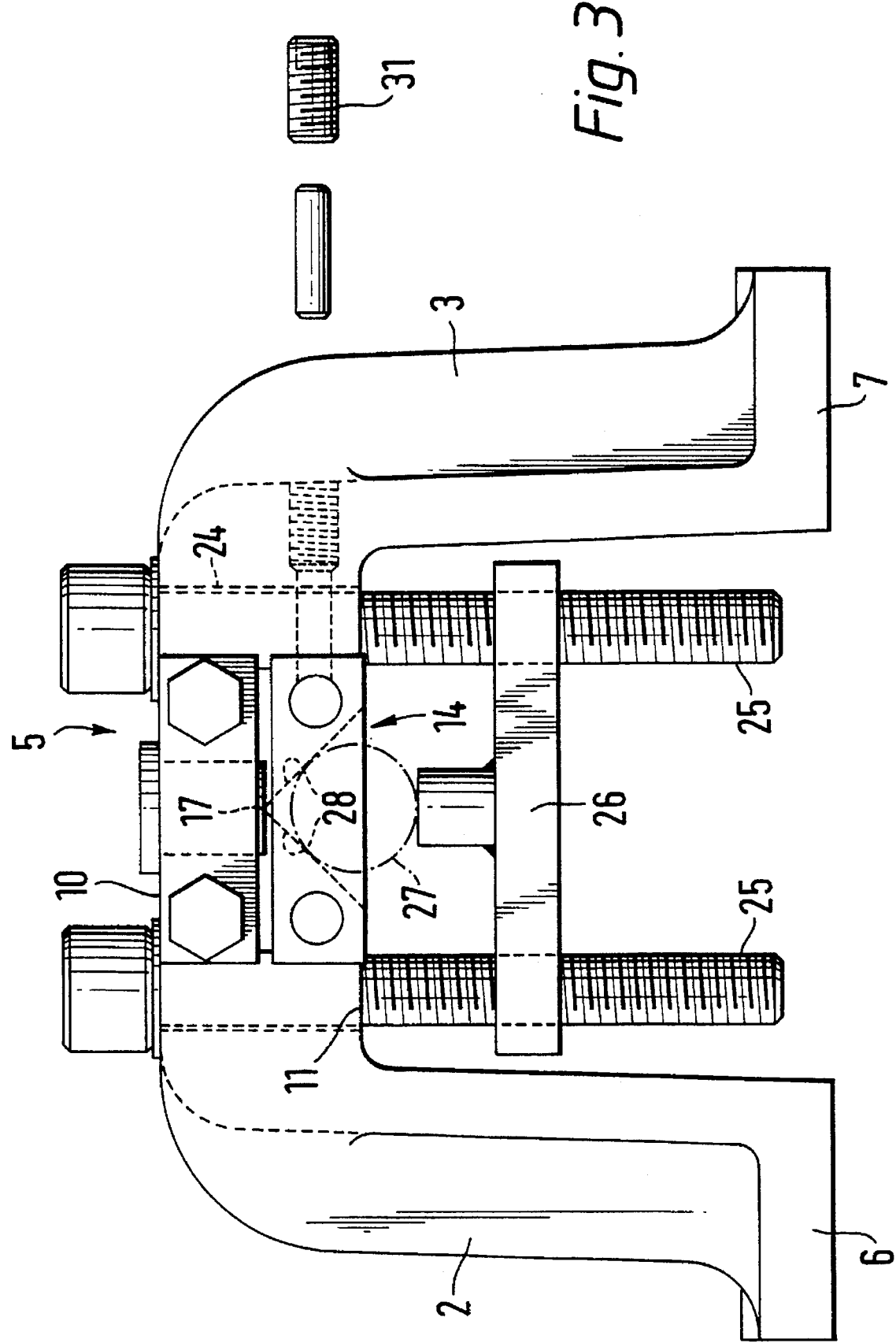
FIG. 3 is a view from one end of the apparatus of FIGS. 1 and 2.

Referring now to FIGS. 1 to 3 of the drawings the apparatus shown in these Figures is particularly intended for use as a drilling jig.

The apparatus/jig includes a main body 1 including two leg members 2 and 3 interconnected at their upper ends by a bridging part 5 and at the other ends thereof in side by side spaced apart base/foot members 6 and 7, each foot member being provided with a slot 8 and a through bore 9 for facilitating the clamping down of the associated foot member and thus the main body to a workbench or the like.

As will be noted from the Figures the main body incorporates various strengthening ribs 9.

As will be noted from FIG. 3 the overall form of the main body provides an inverted U formation.

The shape of the bridging part is generally of a rectangular cross section form providing a top face 10, a bottom face 11, a front face 12 and a rear face 13.

An inverted vee shaped recess 14 is formed in the bottom face, the vee recess 14 being symmetrically located in the bottom face and thus with respect to the main body as a whole and extends the full length of the bottom face from the front face to the rear face with the line containing the apex of the vee extending horizontally.

A second vee shaped recess 15 is formed in the bridging part, this second recess 15 being provided in the front face 12. The positioning of the second recess is such that the apex 16 of the second recess intersects the vertical plane containing the apex 17 of the first Vee recess 14. This second vee recess 15 is intended positionally to locate a bush 18 for guiding a drill (not shown) during the use of the drill jig of the invention.

The drill bush 18 is held in place by a cramping plate 19 which is itself secured to the front face of the bridging part 5 by bars/bolts 20 which pass through the bridging part 5 to project outwardly of the opposite end of the bridging part 5.

A second plate 21 is slidably located on these bolts 20. The position of the second plate 21 with respect to the bolts 20 is effected by nuts 22 provided upon the bolts 20 and a bolt 23 which passes centrally through the plate 21 to bear against the rear face 13 of the bridging part 5. Relative positional adjustments of the nuts and the bolts determines the position of the clamping plate 19 and make it possible for bushes 18 of various diameters to be used.

Two vertical bores 24 are formed in the bridging part 5 one to each side of the first vee shaped recess 14. As will be seen from the Figures the vertical axes of these two bores 24 lie in a vertical plane extending at right angles to the front and rear direction of the drill jig.

These two bores 24 are freely engaged by bolts 25 which threadably engage with a workpiece support plate 26 in such manner that rotation of these two bolts 25 raises or lowers the workpiece support plate 26 and any workpiece 27 resting thereon.

In use, the workpiece support plate 26 is raised sufficiently to bring the workpiece 27 into firm contact with the sides 28 of the first vee recess 14 and thereby to centre the workpiece 27 with respect to the vee recess 14 and thus also with respect to the vertical axis of any drill bush 18 mounted to the bridging part.

In order to be able positionally to set a workpiece 27 lengthwise of the drill jig, the latter is provided with a stop plate 28A which is itself positionally adjustable and which is intended to engage with the front end of a workpiece.

The stop plate 28A is supported from two bars 29 engaging in horizontal bores 30 extending from the bridging part front face 12 to the rear face 13 and are located inwardly of the two vertical bolt bores 30. These bars 29 are freely slidable with respect to the bridging part and are lockable in a desired position by means of a locking screw 31 which can be adjusted to lock the workpiece stop bars 29 against positional movement relative to the bridging part 5.

In a second construction of the machining jig of the invention the said first and second vee shaped recesses are formed in a common plate which is mounted for operational displacement with respect to the main body towards or away from the workpiece support plate.

In this second construction/embodiment the relative movement between the workpiece and the surfaces of the second vee-shaped recess for the purposes of exerting a required operational cramping action therebetween involves the use of a pair of chains for enabling control over the cramping pressures exertable between the workpiece and the walls of the first vee recess.

Figure 4:
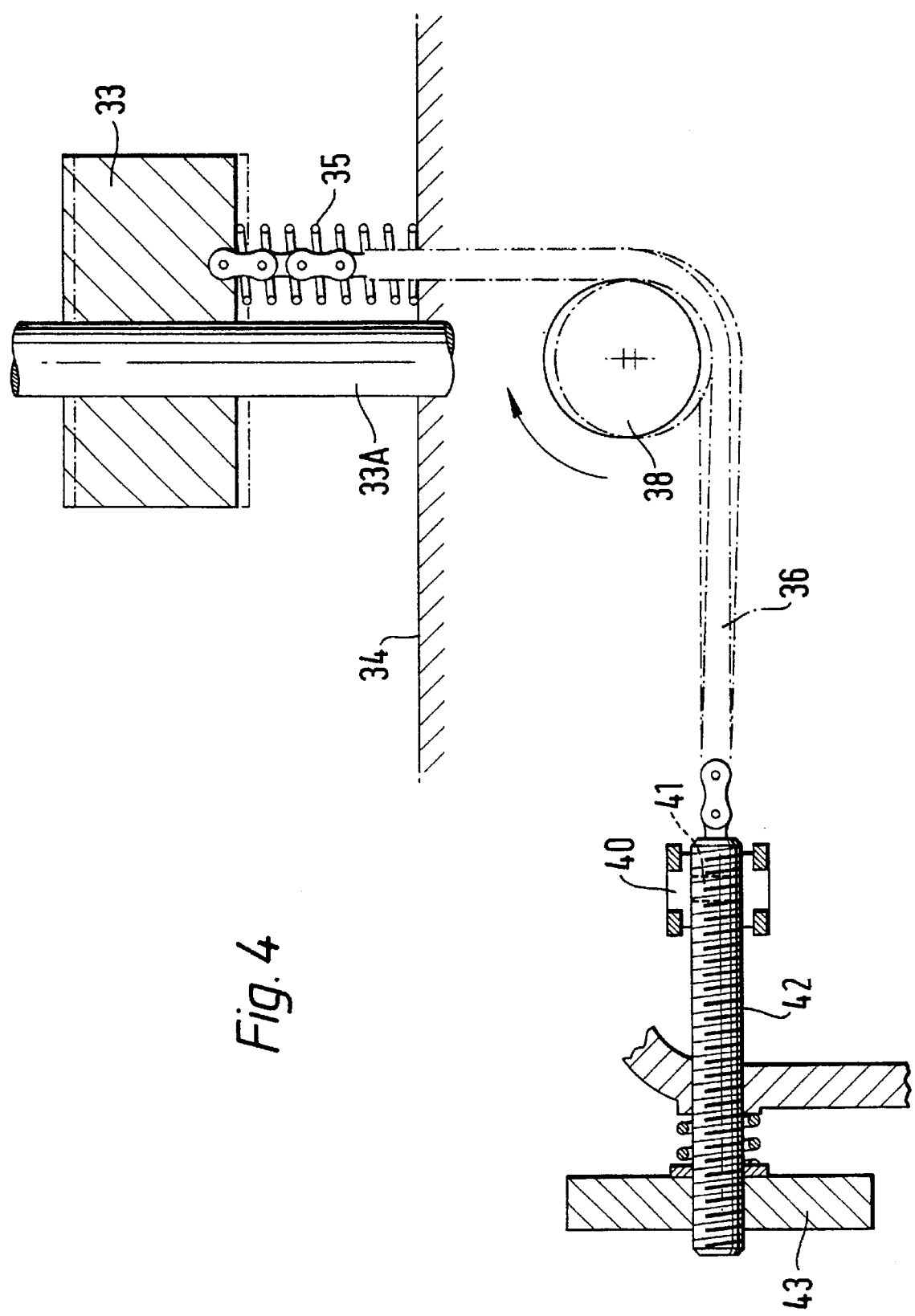
FIG. 4 is a very schematic representation of an arrangement for controlling the cramping force exterted on a workpice when mounted in the apparatus of the invention.
Figure 5:
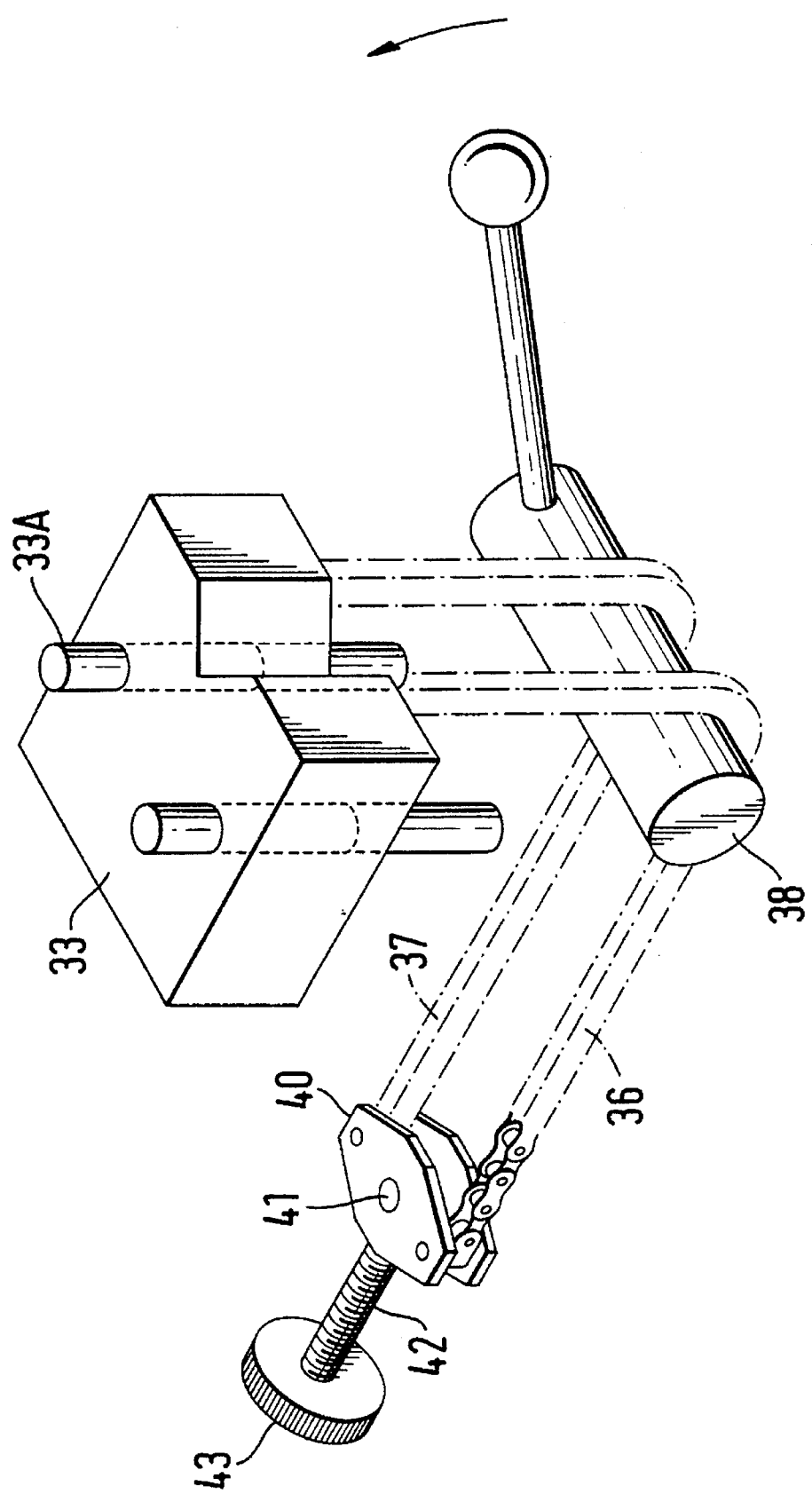
FIG. 5 is a highly schematic view of the arrangement of FIG. 4.

An embodiment of this construction of the apparatus of the invention is shown in FIGS. 4 and 5.

As may be noted from these Figures the first vee shaped recess 14 is provided in a common plate/block 33 that is vertically movable on the bars towards or away from a workpiece support surface 34 that is positionally fixed relative to the reminder of the jig structure main body 1.

The block 33 is resiliently loaded by a spring 35 in an upwardly direction away from the workpiece support surface 34 to allow workpieces to be positioned as required.

The block 33 is pulled downwards against the resilient loading thereof in order to cramp the walls 27 of the vee recess 14 against the workpiece.

In the embodiment shown in FIGS. 4 and 5 the block 33 is pulled down by an arrangement including a pair of side by side chains 36, 37 passing over an eccentrically mounted roll 38 located beneath the workpiece support surface 34 and connecting with opposite sides of the block 33. It will be appreciated that the eccentric mounting of the roll 38 affords a camming action on rotation thereof.

The other ends 39 of the chains 36, 37 connnect with a chain rocker assembly 40 whose central pivot 41 is coupled to a bolt 42 whose axial position is adjustable relative to the remainder of the jig structure by means of a rotatable nut 43 on the bolt 42 serving axially to displace the bolt relative to the structure and thus the vee block 33 by way of the chains.

In use, the operating head is rotated so that the bolt is axially displaced relative to the jig structure whereby the effective lengths of the chains can be lengthwise adjusted to move the block 33 downwards against its resilient loading thereby to bring the vee recess side walls 27 into a location near to the work piece or to the condition of lightly touching the workpiece.

The final cramping force required to operationally clamp the workpiece in a required position is produced by the rotation of the eccentrically mounted roll 38 such rotation enabling a camming effect to be produced on the rotation thereof.

To avoid the possibility of an overtightening of the chains a safety spring is interposed between the operating nut and that part of the drill jig structure engaged by the bolt 42.

We claim:

1. Apparatus for facilitating drilling or similar machining operations upon a workpiece, the apparatus including a vertically directed first vee shaped recess for interchangeably receiving and centring tool guide arrangements for the tools required to be used for machining the workpiece; means for cramping a selected tool guide arrangement against the mutually inclined faces of the first vee shaped recess; a second vee shaped recess whose apex is directed transversely of the apex of the first vee recess and intersects the apex of the first vee recess; a workpiece support means mounted for displacement towards and away from the second vee shaped recess in such manner that a workpiece placed upon the workpiece support means can be brought into firm contact with the faces of the second vee shaped recess, and means for positionally locating a workpiece upon the workpiece support means.

2. Apparatus as claimed in claim 1, and comprising means for the displaceable mounting of the workpiece support means with respect to the main body for the purposes of operational setting of the workpiece.

3. Apparatus as claimed in claim 1 or 2, and including a plate in which said first and second vee shaped recesses are formed, means for mounting said plate for operational displacement with respect to the main body towards or away from the workpiece support means.

4. Apparatus as claimed in claim 3, and including means for resiliently loading plate in a direction away from the workpiece support means.

5. Apparatus as claimed in claim 4, and including a pair of chains interconnecting the workpiece support means and the plate whereby relative movement produced between the workpiece support means and the plate for the purposes of exerting a required operational cramping action therebetween involves exerting pull on the pair of chains, and in which the extent of pull enables control over the cramping pressures exertable between the workpiece and the plate.

6. Apparatus as claimed in claim 4, and including an eccentrically mounted roll located beneath the workpiece support surface, and wherein the chains pass over the roll and connect with opposite sides of the plate.

7. Apparatus as claimed in claim 6, and wherein a final cramping pressure between a workpiece and the walls of the first vee shaped recess is arranged to be produced by rotation of the eccentrically mounted roll.

8. Apparatus as claimed in claim 1, and wherein the tool guide arrangements comprises drill, reamer or similar rotary tool bushes.

9. Apparatus as claimed in claim 1, and including an elongate anvil member for supporting a workpiece is interposable between the support plate and the block, said anvil member being so positionable that it extends symmetrically lengthwise of the first vee shaped recess, thereby to enable accommodation of workpieces having external dimensions such that they can fully enter the first vee shaped recess.

10. Apparatus as claimed in claim 1, and including wherein a workpiece stop or positioning means to enable easy setting of the workpiece with respect to the apparatus, whereby each one of a series of workpieces to be machined can be readily set to a predetermined setting with respect to the apparatus.

* * * * *